Figure 1:
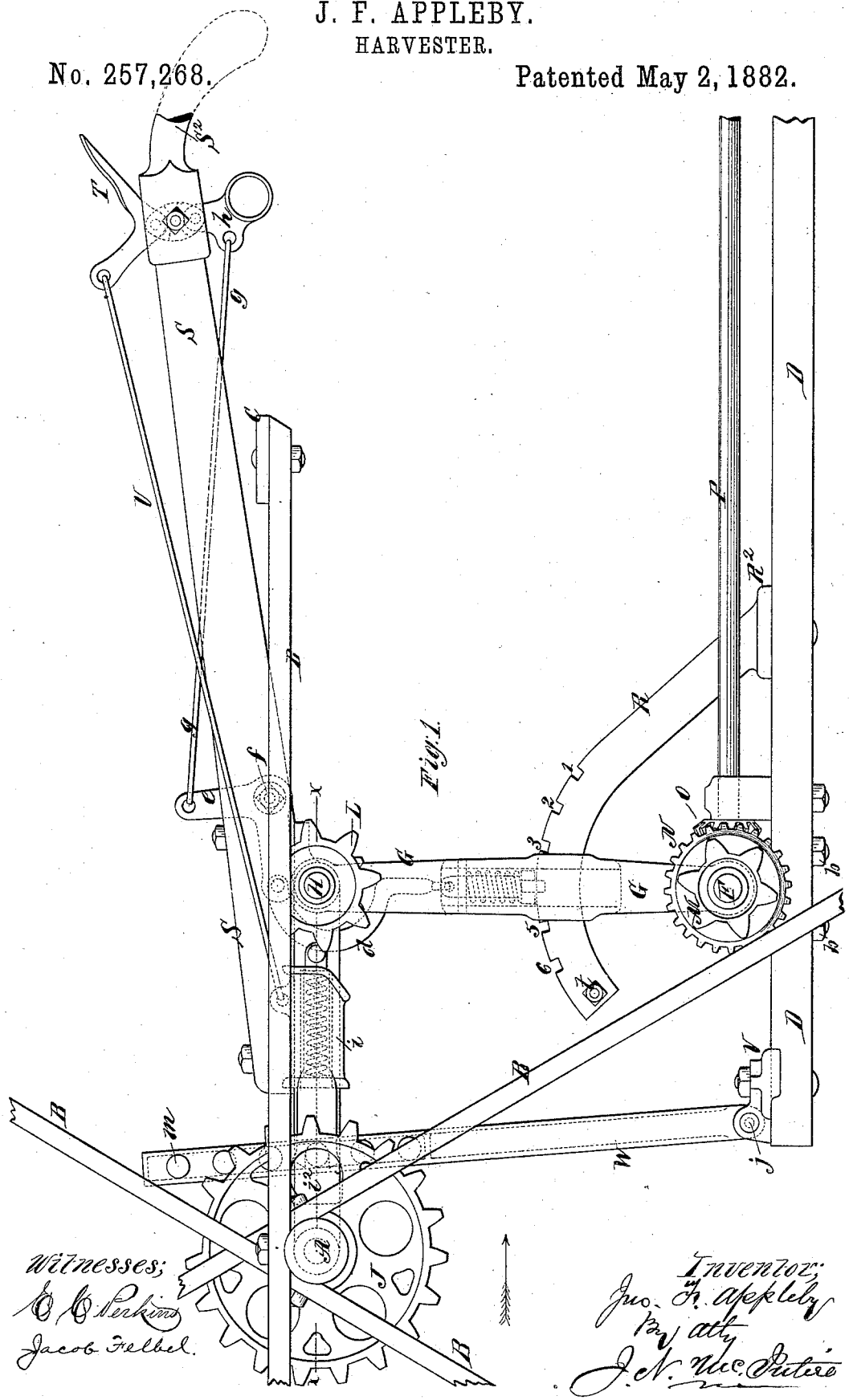

(No Model.) 3 Sheets—Sheet 1.

J. F. APPLEBY.
HARVESTER.

No. 257,268. Patented May 2, 1882.

Witnesses:
O. O. Perkins
Jacob Felbel

Inventor:
Jno. F. Appleby
By atty
J. N. McIntire

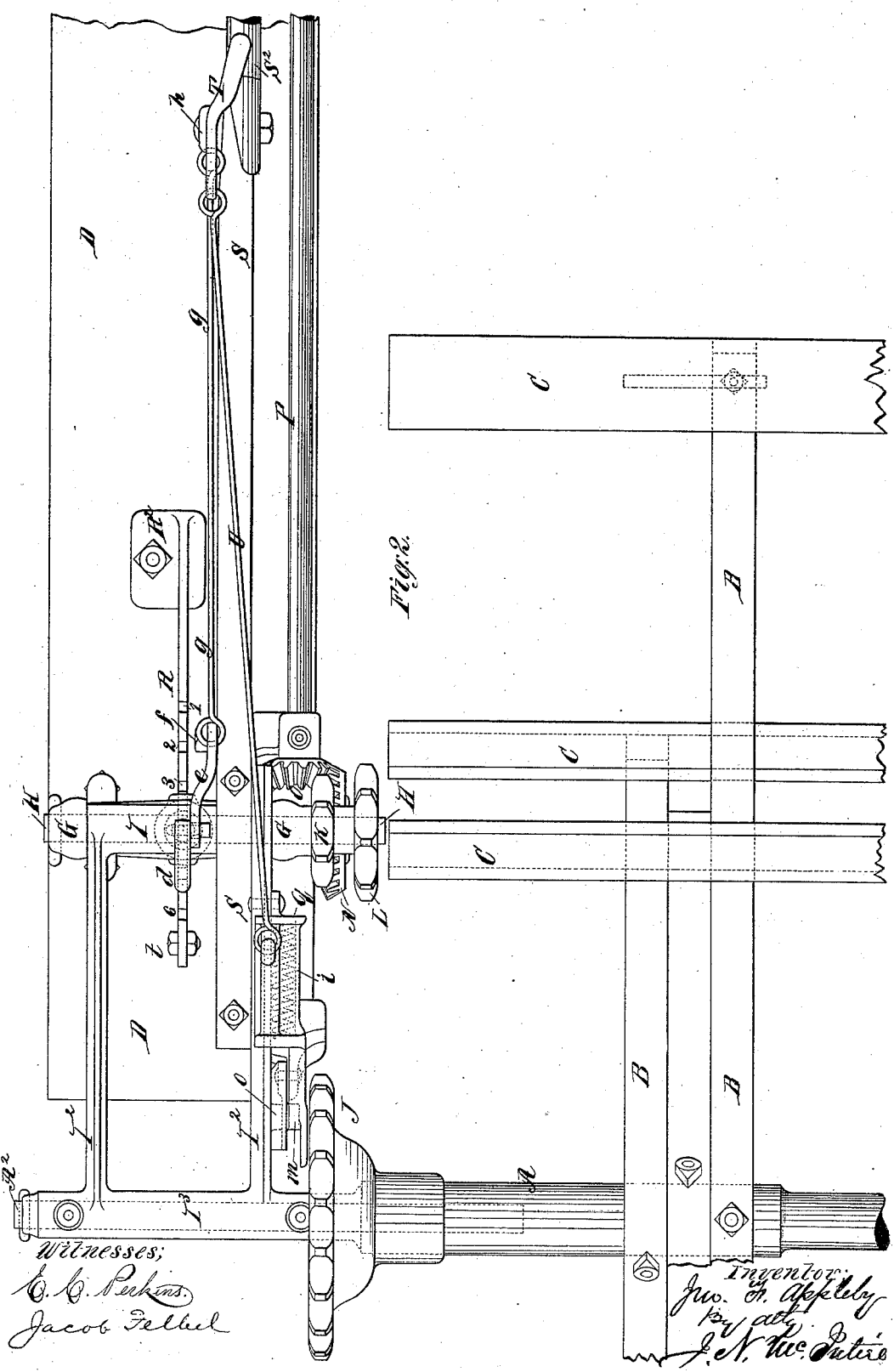

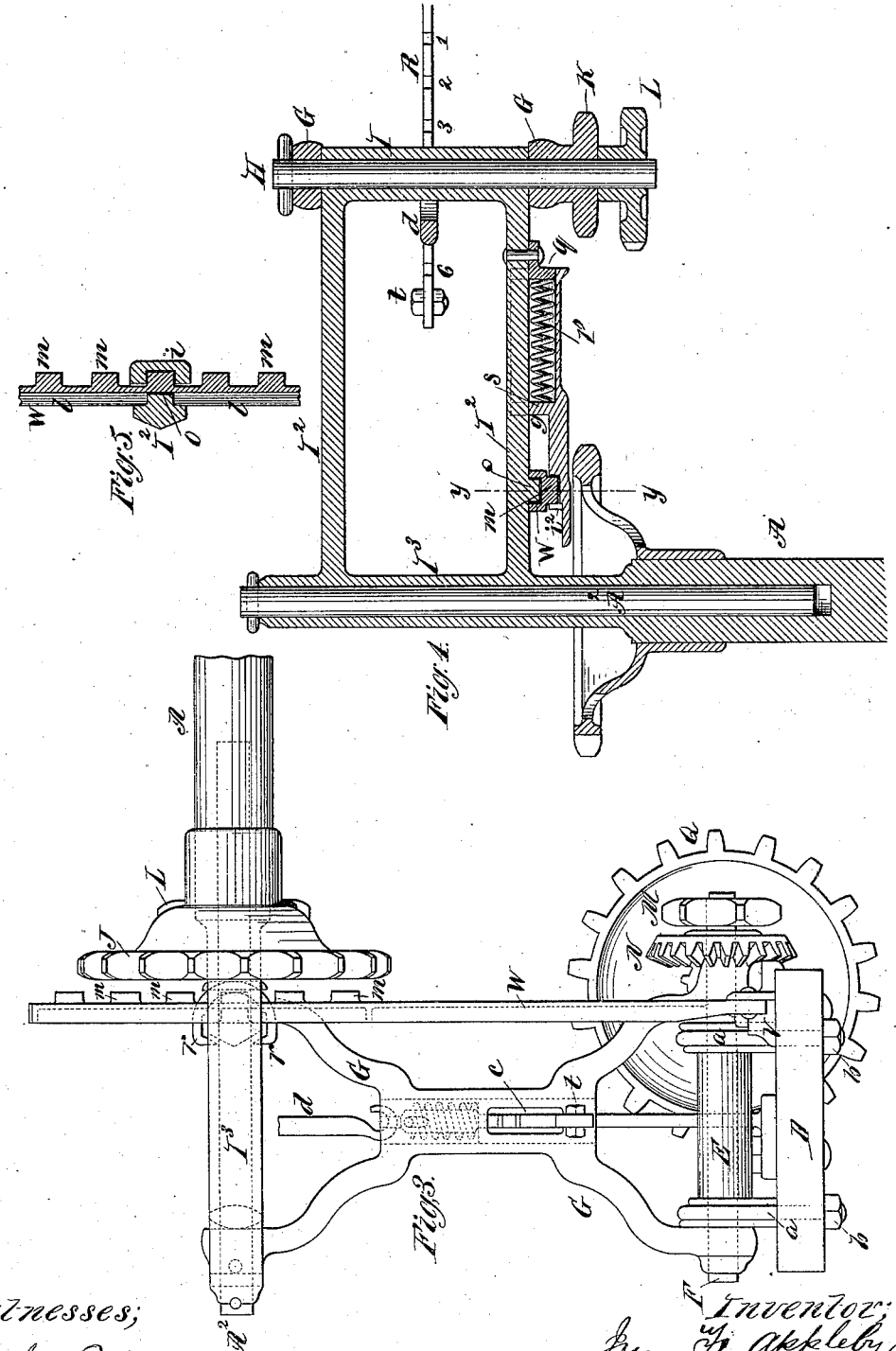

UNITED STATES PATENT OFFICE.

JOHN F. APPLEBY, OF MINNEAPOLIS, MINNESOTA, ASSIGNOR TO THE MINNEAPOLIS HARVESTER WORKS, OF MINNESOTA.

HARVESTER.

SPECIFICATION forming part of Letters Patent No. 257,268, dated May 2, 1882.

Application filed February 8, 1882. (No model.)

*To all whom it may concern:*

Be it known that I, JOHN F. APPLEBY, of Minneapolis, in the county of Hennepin and State of Minnesota, have invented certain new and useful Improvements in Harvesters; and I do hereby declare that the following is a full, clear, and exact description thereof, reference being had to the accompanying drawings, making part of this specification.

My invention relates to a novel mechanism or means for adjusting the reels of harvesters. Previous to my invention it has been customary to have the reel capable of adjustment both up and down and backward and forward relatively to the cutting apparatus of the machine, and various contrivances or mechanisms have been devised for the purpose of enabling the operator or driver to thus adjust the reel during the travel of the harvester; but all such contrivances with which I am familiar have been more or less defective, either as to their capacity to perfectly adjust the reel conveniently to the driver or on account of their complexity of construction or lack of combined strength and lightness. I propose to provide for use reaping and harvesting machines with wheels which may be very easily adjusted to and firmly held in any desired position while the machine is traveling by means which shall be very convenient to operate by the driver, and which at the same time shall embody strength and lightness without any unnecessary complexity of construction; and to these main ends and objects my invention consists in the novel contrivances hereinafter more fully explained and specifically claimed.

To enable those skilled in the art to make and use machines containing my invention, I will now proceed to more particularly describe the latter, referring by letters to the accompanying drawings, forming part of this specification, and in which I have shown at Figure 1 in an elevation looking endwise at the reel, my novel contrivance, and at Fig. 2 a top view of the same—in each of which figures I have shown the reel sufficiently to illustrate my invention. Fig. 3 is an elevation looking at the machine in the direction indicated by the arrow at Fig. 1. Fig. 4 is a partial horizontal section at the line $xx$ of Fig. 1, to show more particularly certain details of construction; and Fig. 5 is a detail vertical (partial) section at the line $yy$ of Fig. 4.

In the several figures the same part will be found designated by the same letter of reference.

A is shaft, B the arms, and C the beaters, of an ordinary harvester-reel; and D represents a sill-piece or beam of the harvester, on which is supported the reel sustaining and adjusting contrivance or mechanism.

In a metallic stand, E, mounted on the sill or beam D, and securely fastened thereto by bolts $a$ and nuts $b$, is arranged a shaft or arbor, F, upon which is hinged the lower bifurcated end of the reel-shaft stand G. The upper end of this stand G is also bifurcated, and has mounted in it a shaft, H, on which is hinged the rearmost tubular portion I of a rectangular frame, the parallel side bars, $I^2$, of which extend forward to a forward tubular or sleeve-like portion, in which is journaled the spindle $A^2$ of the reel-shaft.

On the reel-shaft is a chain-wheel, J, which is belted by a chain-belt to a chain-wheel, K, on shaft H, while another chain-wheel, L, on said shaft H is belted by a chain-belt to the wheel M on the shaft F. On this last-mentioned shaft is a bevel-gear, N, which engages with a bevel-pinion, O, on the end of the driving-shaft P, which latter receives motion from the harvester motive machinery through the medium of a gear, Q, at the rear end of said shaft. (Seen only at Fig. 3.)

Now, it will be understood that the gears O and Q being fast on shaft P and the gear N and wheel M being fast on shaft F, the rotatory motion of shaft P will be transmitted through gear N to wheel M and a chain-belt passing from the latter to L will drive it, and that K and L being loose on shaft H, but keyed to each other, the movement of L will be transmitted through K and a belt on the latter to the chain-wheel J of the reel-shaft.

R is a thin curved standard, the base $R^2$ of which is bolted fast to the upper surface of beam D, and the curved portion of which is concentric to the shaft F and passes through a slot, $c$, in the stand G. The upper edge of the curved stand R has several notches, at 1 2, &c., with which engages the lower end of a spring-bolt or latch-bar, (shown in dotted lines at Figs. 1 and 3,) the upper end of said bolt being coupled to the lower end of a curved lifter, d, the upper end of which is pivoted to one end of an angle-lever, e, fulcrumed at f, and having its other end attached to one end of a rod, g, the other end of which is secured to a trigger-piece, h. (See Figs. 1 and 2.)

S is a bar or lever secured at its forward end to one of the side bars, I², of the rectangular metallic stand before referred to, and provided at S² with a hand-piece adapted to be grasped by the operator. To this handle is pivoted the trigger h, before referred to, and also a lever or thumb-piece, T, to one end of which is secured the rear end of a rod, U, the forward end of which is coupled to a sliding bolt, i, the function of which will be presently explained.

To the front end and near one edge of the beam D is securely bolted a metallic stand, V, to which is pivotally attached, at j, the lower end of a metal bar or beam, W, that extends upwardly and some distance above the rectangular frame above referred to, to one of the side bars, I², of which it is connected in a manner which I will now explain. The bar W is formed or provided on one side, at intervals and for a distance nearly equal to half its length, with a series of short projecting pins, teats, or circular bosses, m, while the opposite side or face of said bar is recessed out longitudinally, as best seen at l, Fig. 5.

On the outer side of one of the side bars, I², of the frame before mentioned is a circular boss or teat, o, that projects into the longitudinal recess l of the bar W, and on the same side bar of said frame is located the sliding bolt i, above alluded to, which bolt has a bifurcated end, (see dotted lines at Fig. 1,) that is adapted to engage with the bosses m of said bar W. This bolt is arranged to slide on the bar I², as shown, bent-over claws r r (see Fig. 3) holding it laterally in place against said bar I², and it is constantly pressed in one direction by a spiral spring, p, (see Fig. 4,) which bears at one end against the shoulder s of said bolt and at the other end against a small stand, q, secured to the side bar, I², as shown.

The upper end of R is provided with a stop, preferably a short bolt and nut, as seen at t, simply to prevent the bifurcated reel-supporting stand G from swinging too far forward when the latch-bolt before referred to may be out of engagement with the notches 1 2, &c.

The operation will be understood to be as follows: Suppose the parts of the contrivance to be in the relative positions seen in the drawings. If now the operator desires to either elevate or depress the reel, he operates with his thumb the piece T, thereby withdrawing the bolt i far enough to free it from the boss m, which it was engaged with, and while holding the bolt back he either presses down or lifts the handle S², which he has hold of, and by turning the frame I I² I³ and all its attachments about the shaft H as an axis of motion he brings the bolt i into a position to engage with some higher or lower one of the series of bosses m, and then, releasing the thumb-piece T from pressure, allows the said bolt i to be moved by its spring p and made to engage with such boss m, the bar W being always prevented from falling or turning forward or backward by the teat O of side bar, I², engaged with the longitudinal recess l of bar W, and said bar W being always prevented from getting laterally out of place near its upper end by being always confined between the side bar, I², and the projecting portion i² of the bolt. (See Fig. 4.)

If it be desired to move the reel either forward or backward, the operator, while grasping the handle S², operates the trigger h so as to lift the curved device d, whereby the spring-latch bolt in stand G is disengaged from its notch in the curved bar R, and while held thus disengaged the handle S² is moved either backward or forward, causing the whole contrivance to swing at its upper part about the axes F and j until the spring-latch comes into a position to be engaged with any other desired one of the notches 1 2, &c. It will be seen that the operator, by grasping and moving the handle S² either up and down or backward and forward, while at the same time he manipulates the thumb-piece T and the trigger h, can very easily shift the position of the reel as circumstances may require; and it will be observed that while the mechanism shown enables him to thus easily and conveniently manipulate the reel said mechanism is exceedingly simple, strong, and light.

What I claim as new, and desire to secure by Letters Patent, is—

1. In combination with a supporting stand or device, G, hinged at its lower end, as described, and a frame hinged at its rearmost part to the upper end of said device G and carrying at its forward end the spindle or arbor of the reel, belt-wheels J, K, L, and M, arranged in the manner specified, and a hand-lever, S, adapted to move the said stand G about its pivotal point of support, and also to move the said frame about its pivotal connection with said stand.

2. In combination with a supporting-stand, G, hinged at its lower end, and the reel-carrying frame hinged to the upper end of said stand, as specified, the hand-lever S and a locking mechanism operating to fasten the stand G in different positions, all substantially in the manner set forth.

3. In combination with the hinged stand G, the reel-carrying frame hinged thereto, and the hand-lever S, a bar, W, hinged at its lower end forward of the stand G, and means for effecting an interlocking of said bar with the forward end of said reel-carrying frame, all substantially in the manner and for the purpose set forth.

4. In combination with the hinged stand G, the reel-carrying frame, and the hand-lever, a spring latch-bolt arranged in stand G and adapted to engage with a stationary device, R, a lifter device, d, angle-lever e, rod g, and trigger h, the whole arranged to operate substantially as set forth.

5. In combination with the hinged reel-carrying frame and hand-lever S, a supporting-bar, W, adapted to engage at one side with a boss on said frame and at the other side with a spring-bolt device, i, provided with a rod extending back to within close proximity to the handle of said lever, all substantially as and for the purpose set forth.

JOHN F. APPLEBY.

In presence of—
 JOHN DARBY,
 WM. K. DEVOE.